US00H002068H

(19) United States

(12) Statutory Invention Registration (10) Reg. No.: US H2068 H

Carter et al. (43) Published: Jul. 1, 2003

(54) PNEUMATIC TIRE AND INNERLINER AND METHOD FOR MANUFACTURE

(75) Inventors: John Darrell Carter, Uniontown, OH (US); Richard Robinson Smith, Cuyahoga Falls, OH (US); William George Perkins, Akron, OH (US); William Chung-Tsing Tung, Tallmadge, OH (US)

(73) Assignee: The Goodyear Tire & Rubber Company, Akron, OH (US)

(21) Appl. No.: 08/734,147

(22) Filed: Oct. 21, 1996

(51) Int. Cl.[7] ..... B60C 5/12; B60C 5/02; C08L 23/04; B32B 25/12

(52) U.S. Cl. ..... 152/510; 152/511; 525/240; 525/334.1; 428/495; 428/515

(58) Field of Search ..... 152/510, 511, 152/DIG. 16; 525/240, 334.1; 428/495, 515–520

(56) References Cited

U.S. PATENT DOCUMENTS

| | | | | | |
|---|---|---|---|---|---|
| 2,268,162 | A | * | 12/1941 | Myles et al. | 525/240 |
| 2,751,322 | A | * | 6/1956 | Bost | 428/495 |
| 3,086,957 | A | * | 4/1963 | Carter | 525/240 |
| 3,403,072 | A | * | 9/1968 | Wheat | 428/517 |
| 3,575,779 | A | * | 4/1971 | Chapman et al. | 525/240 |
| 3,650,874 | A | * | 3/1972 | Job et al. | 428/495 |
| 4,396,051 | A | * | 8/1983 | Ogawa et al. | 152/510 |
| 4,790,365 | A | * | 12/1988 | Sandstrom et al. | 152/510 |
| 5,040,583 | A | | 8/1991 | Lin et al. | |
| 5,178,702 | A | | 1/1993 | Frerking, Jr. et al. | |
| 5,443,104 | A | * | 8/1995 | Dollinger et al. | 152/510 |

FOREIGN PATENT DOCUMENTS

| | | |
|---|---|---|
| EP | 0 337 279 | 10/1989 |
| WO | WO 92/20538 | 11/1992 |

OTHER PUBLICATIONS

Dow Chemical Co., *Tailor–Made Resins*, 3 pgs., Nov., 1990.

* cited by examiner

*Primary Examiner*—Michael J. Carone
*Assistant Examiner*—Aileen J. Baker

(74) *Attorney, Agent, or Firm*—Alvin T Rockhill

(57) ABSTRACT

A pneumatic tire and an innerliner for use in a pneumatic tire are provided by the invention. The innerliner comprises a multilayer structure including a barrier layer and an adhesive layer. The barrier is a blend of high chlorine content chlorinated polyethylene elastomer and low chlorine-content chlorinated polyethylene elastomer. The adhesive can include a nitrile rubber composition or an ultra high molecular weight elastomer. The present invention more specifically discloses a pneumatic tire comprising a carcass and an innerliner, said innerliner comprising a multilayer structure including a barrier layer and an adhesive layer, the barrier layer comprising a blend of high chlorine content chlorinated polyethylene elastomer and low chlorine content chlorinated polyethylene elastomer, the high chlorine content chlorinated polyethylene elastomer having a chlorine content of between about 35 percent to about 45 percent and the low chlorine content chlorinated polyethylene polymer having a chlorine content of between about 25 percent to about 35 percent, wherein the high chlorine content polyethylene has a chlorine content which is at least 5 percentage points higher that the chlorine content of the low chlorine content polyethylene; the adhesive layer comprising a polymer composition for adhering the barrier layer to said rubber carcass; and wherein the innerliner provides an oxygen permeability of less than 250 cc-mil/100 in$^2$-atm-day at 65° C. and good cold flexibility at −40° C.

22 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Figure 2: Two-Piece Peel Adhesion Testpiece
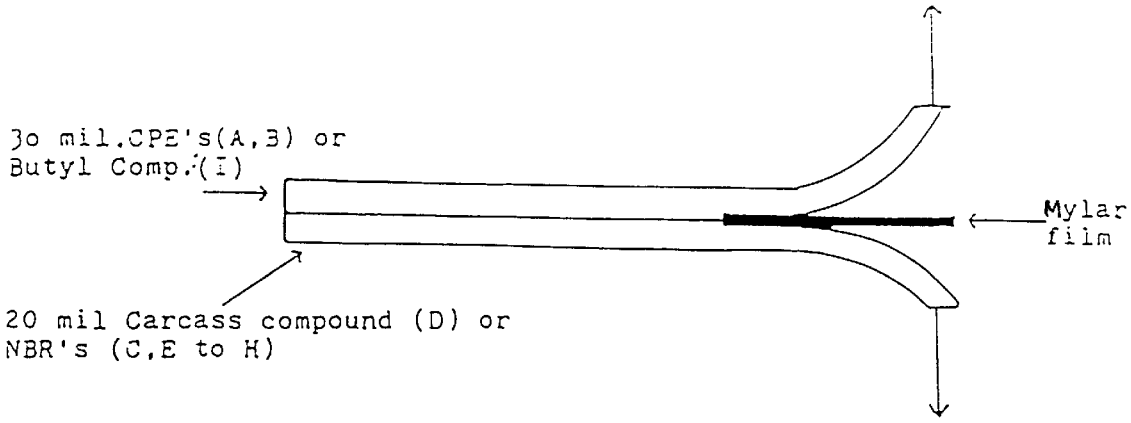
Figure 3 : Three-Piece Adhesion Testpiece
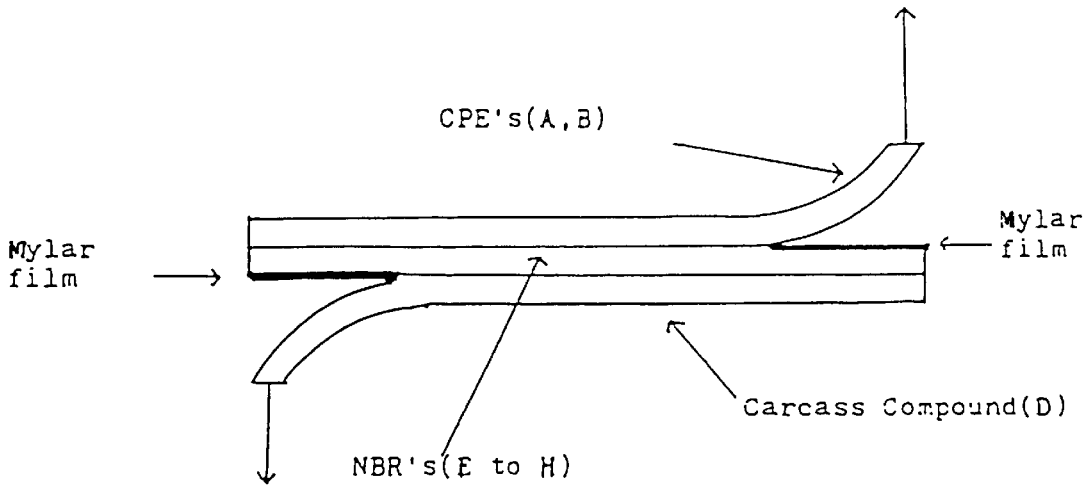

Adhesion vs. AN Content of
NBR Adhesion Layer

PNEUMATIC TIRE AND INNERLINER AND METHOD FOR MANUFACTURE

FIELD OF THE INVENTION

The present invention relates to a pneumatic tire and an innerliner containing chlorinated polyethylene elastomer and method for manufacturing a pneumatic tire.

BACKGROUND OF THE INVENTION

The inner surface of pneumatic tires generally include an elastomeric composition designed to prevent or retard air and moisture permeation and maintain tire pressure. This elastomeric composition is often referred to as the innerliner. Butyl rubber and halobutyl rubber are commonly used for forming pneumatic tire innerliners because they are relatively impermeable to air and moisture and exhibit other desirable physical properties; such as, flex fatigue resistance and age durability. Chlorobutyl rubber is probably the most commonly used innerliner material.

Butyl rubber and halobutyl rubber are expensive. As a result, it is desirable to provide a less expensive material for pneumatic tire innerliners while maintaining the desirable properties of air and moisture impermeability, flex fatigue resistance and aged durability, and without adversely affecting the performance of the tire. Alternatives to butyl rubber have been proposed. For example, U.S. Pat. No. 5,178,702 to Frerking, Jr. et al describes a multi-layered innerliner prepared from at least two barrier layers of sulfur-cured rubber composition containing acrylonitrile/diene copolymer and a nonbarrier layer of sulfur-cured rubber therebetween. U.S. Pat. No. 5,040,583 to Lin et al describes an innerliner having non-elastomeric barrier layers of vinylidene chloride polymer or ethylene-vinyl alcohol copolymer sandwiched between two layers of elastomeric material.

Chlorinated polyethylene has been proposed for use as a barrier layer for a pneumatic tire innerliner. According to WO 92/20538 which was published on Nov. 26, 1992, a film prepared from chlorinated polyethylene containing 35 to 50 percent by weight chlorine, a derivative of 2,5-dimercapto-l-3,4 thiazole as a curative, an accelerator, an acid acceptor and optionally carbon black can provide an innerliner which is lighter than butyl or halobutyl rubbers without losing air impermeability, heat resistance and mechanical properties. It is recognized, however, that chlorinated polyethylene exhibits poor adhesion to a tire. The WO 92/20538 publication describes adhering the chlorinated polyethylene to a tire by using an adhesive resin based on styrenic block copolymer, ethylene-vinyl acetate or a blend of ethylene-vinyl acetate and styrenic block copolymer.

SUMMARY OF THE INVENTION

The invention is directed toward pneumatic tires having an innerliner which includes a multilayer structure. The multilayer structure includes a barrier layer for providing barrier properties and an adhesive layer for adhering the barrier layer to the tire carcass. In a preferred embodiment, the barrier layer includes a blend of high chlorine content chlorinated polyethylene elastomer and low chlorine content chlorinated polyethylene elastomer. The high chlorine content chlorinated polyethylene elastomer preferably has a chlorine content of between about 35 percent to about 45 percent and more preferably between about 38 percent to about 43 percent. The low chlorine content chlorinated polyethylene polymer preferably has a chlorine content of between about 25 percent to about 35 percent and more preferably between about 28 percent to about 32 percent. The adhesive layer includes a polymer composition for adhering the barrier layer to the carcass. The innerliner provides an oxygen permeability of less than 250 cc-mil/100 $in^2$-atm-day and preferably less than about 200 cc-mil/100 $in^2$-atm-day and good cold flexibility at −40° C.

In a preferred embodiment of the invention, the adhesive layer can include a nitrile rubber composition having an acrylonitrile content of between about 16 percent and about 27 percent. Alternatively, the adhesive layer can include an ultra high molecular weight polyethylene elastomer. It is desired that the adhesive layer can provide a peel strength of at least 5 lb/in for adhering the barrier layer to the carcass.

The subject invention specifically discloses a pneumatic tire comprising a carcass and an innerliner, said innerliner comprising a multilayer structure including a barrier layer and an adhesive layer, the barrier layer comprising a blend of high chlorine content chlorinated polyethylene elastomer and low chlorine content chlorinated polyethylene elastomer, the high chlorine content chlorinated polyethylene elastomer having a chlorine content of between about 35 percent to about 45 percent and the low chlorine content chlorinated polyethylene polymer having a chlorine content of between about 25 percent to about 35 percent, wherein the high chlorine content polyethylene has a chlorine content which is at least 5 percentage points higher that the chlorine content of the low chlorine content polyethylene; the adhesive layer comprising a polymer composition for adhering the barrier layer to said rubber carcass; and wherein the innerliner provides an oxygen permeability of less than 250 cc-mil/100 $in^2$-atm-day at 65° C. and a cold flexibility at −40° C.

The present invention also discloses an innerliner for use in a pneumatic tire comprising: a multilayer structure including a barrier layer and an adhesive layer, the barrier layer comprising a blend of high chlorine content chlorinated polyethylene elastomer and low chlorine content chlorinated polyethylene elastomer, the high chlorine content chlorinated polyethylene elastomer having a chlorine content of between about 35 percent to about 50 percent and the low chlorine content chlorinated polyethylene polymer having a chlorine content of between about 20 percent to about 38 percent; and the adhesive layer includes a rubber material for adhering the barrier layer to another surface.

BRIEF DESCRIPTION OF THE DRAWINGS

FIG. 2 shows the configuration of a test piece used to measure peel adhesion;

FIG. 3 shows the configuration of a test piece which simulates tire construction.

DETAILED DESCRIPTION OF THE PREFERRED EMBODIMENT

Figure 1:
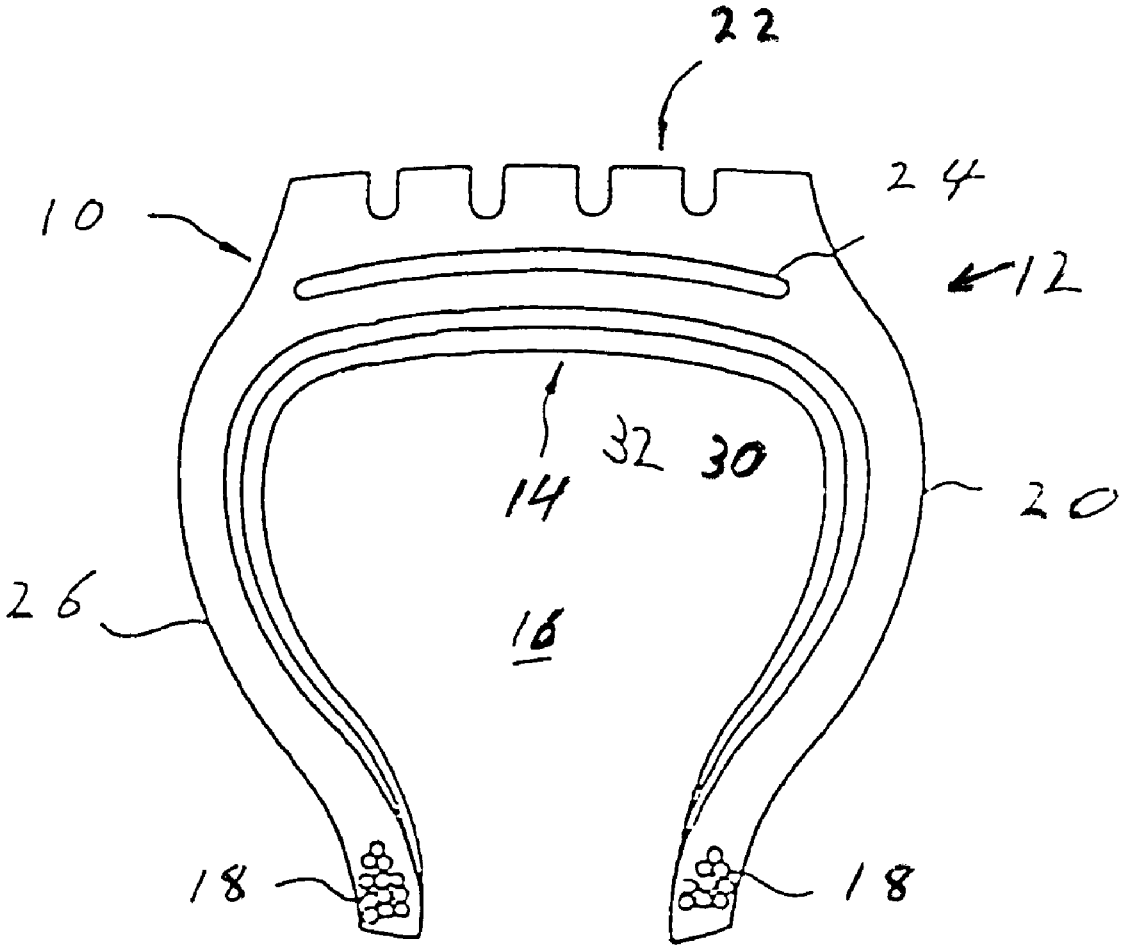
FIG. 1 is a cross-sectional view of an embodiment of the pneumatic tire according to principles of the present invention.

The present invention relates to a pneumatic tire having desirable properties. The pneumatic tire includes, as two of its components, an innerliner which is impermeable to air and moisture and a carcass which bonds or adheres to the innerliner. It should be appreciated that the innerliner is the component of the pneumatic tire which is primarily responsible for the retention of compressed air when the tire is mounted on a wheel and inflated. The carcass is the component of the pneumatic tire which includes the plies forming the body of the tire.

The innerliner of the invention can be referred to as a chlorinated polyethylene-based innerliner. This means that the innerliner incorporates a sufficient amount and quality of chlorinated polyethylene elastomer to provide barrier properties such as air and moisture impermeability. It should be appreciated that the innerliner can include materials or components in addition to the blend of chlorinated polyethylene elastomers which can enhance various properties, such as barrier properties and/or cold flexibility properties. In a preferred embodiment, the innerliner does not include butyl rubber or halobutyl rubber as a component.

The innerliner of the present invention is provided with a multilayer structure. This means that the innerliner includes at least two layers—a barrier layer and an adhesive layer. The barrier layer provides the barrier properties (such as, retention of compressed air) and the adhesive layer adheres the barrier layer to the tire carcass sufficiently to resist delamination of the innerliner from the carcass under the normal operating conditions.

The barrier layer and the adhesive layer are discussed in detail below. It should be appreciated that further layers can be provided on the multilayer structure without departing from the principles of the present invention. For example, an additional layer can be provided over the barrier layer to provide further protection and/or to provide stress relief. Furthermore, the barrier layer can be provided as a multilayer structure of two or more layers. It is believed that it may be advantageous to use two barrier layers when building a truck tire. If desired, layers can be provided between multiple barrier layers to enhance compatibility and adhesion between the barrier layers. In the case where there are two or more barrier layers, it should be appreciated that each barrier layer may be provided with a different composition in order to provide desired results.

The innerliner provides an oxygen permeability of less than 250 cc-mil/100 $in^2$-atm-day and preferably less than about 200 cc-mil/100 $in^2$-atm-day. It should be appreciated that such low air permeability values correspond with the air permeability values of pneumatic tires prepared from halobutyl rubber innerliners.

The Barrier Layer

The barrier layer provides retention of compressed air when the pneumatic tire is mounted on a wheel and injected with compressed air. According to the present invention, blends of chlorinated polyethylene elastomer (CPE) are used to prepare the barrier layer and provide the desired air retention properties. Such a barrier layer can be referred to as a chlorinated polyethylene elastomer-based barrier layer. Chlorinated polyethylene elastomer blends are advantageous because they provide good low temperature flexibility and further act as an air and moisture barrier. Preferably, the chlorinated polyethylene elastomer blend has an average chlorine content which is sufficiently high so that it provides required air barrier properties. On the other hand, the average chlorine content should not be so high as to decrease cold flexibility. Generally, this corresponds to a barrier layer having an average chlorine content which is within the range of about 30 percent to about 36 percent and preferably within the range of about 32 percent and about 35 percent.

Chlorinated polyethylene elastomers are known to possess excellent gas barrier properties. Several of these properties are described in International Publication WO 92/20538, the entire disclosure of which is incorporated herein by reference. It is understood that the gas barrier properties of chlorinated polyethylene can be two to five times higher than the gas barrier properties of butyl rubber per unit weight.

Some representative examples of chlorinated polyethylene elastomers which can be used according to the invention are available under the tradename TYRIN® from The Dow Chemical Company and are described in Table 1 where the members of the TYRIN® family are identified by chlorine content and melt viscosity. It should be appreciated that, according to the teachings of the invention, various other chlorinated polyethylene elastomers can be used and are available from other sources.

TABLE 1

TYRIN ® Chlorinated Polyethylene Resins

| Product | Melt Viscosity[1] (Poises) | % Chlorine[2] |
|---|---|---|
| TYRIN 2552 | 13,000 Nominal | 25 |
| TYRIN 3614A | 21,000 Nominal | 36 |
| TYRIN 3615 | 26,000 Nominal | 36 |
| TYRIN 3623A | 17,000 Nominal | 36 |
| TYRIN 3611 | 8,000 Nominal | 36 |
| TYRIN 4213 | 18,000 Nominal | 42 |
| TYRIN 4211 | 10,000 Nominal | 42 |
| TYRIN 4201 | 10,000 Nominal | 42 |

[1]Dow Test Method CPE-D3.
[2]Dow Test Method CPE-D6.

As demonstrated by Example 1, the gas barrier and cold flexibility properties of chlorinated polyethylene elastomers appear to be a function of chlorine content. For a film prepared from TYRIN® 4211p having a chlorine content of 42 percent, the gas barrier properties were good but the cold flexibility properties were poor. For a film prepared from TYRIN® CM0730 having a chlorine content of 30 percent, the gas barrier properties were poor but the cold flexibility properties were good.

It is a discovery of the invention that a blend of high chlorine content chlorinated polyethylene and low chlorine content chlorinated polyethylene can provide a film having both good barrier properties and good cold flexibility properties. It should be appreciated that a high chlorine content chlorinated polyethylene elastomer has a chlorine content in the range of about 35 percent to about 45 percent, and a low chlorine content chlorinated polyethylene elastomer has a chlorine content in the range of about 25 percent to about 35 percent. Preferably, these ranges are about 38 percent to about 43 percent for high chlorine content CPE and about 28 percent to about 32 percent for low chlorine content CPE. While it is appreciated that the ranges for high and low chlorine content chlorinated polyethylene may overlap, it should be understood that a blend of high and low chlorine content chlorinated polyethylene means a blend of at least a first polymer composition having a chlorine content within the range provided for high chlorine content CPE and a second polymer composition having a chlorine content within the range provided for low chlorine content CPE, where the first and is second polymer compositions have significantly different chlorine contents. A significant difference in chlorine content reflects a difference sufficient to provide a CPE-based film having both good barrier properties and good cold flexibility properties. Generally, a significant difference in chlorine content value can be as little as about 3 percent and more preferably at least about 5 percent. It is understood that the difference will generally be at least about 5 percent and may be more than 10 percent. It should be appreciated that these "differences values" reflect the percentage differences in chlorine content for the first and second polymer compositions. For example, a difference value of 12 percent reflects a difference between a first CPE composition having a chlorine content of 42 percent and a second CPE composition having a chlorine content of 30 percent.

In order to provide a barrier layer having desired barrier properties and cold flexibility properties, it may be desired to adjust the ratio of high chlorine content CPE to low chlorine content CPE. It is preferred that the blend should be provided so that the barrier layer has an average chlorine content of between about 30 percent and about 42 percent and more preferably between about 35 percent and about 40 percent. Often, this will reflect a ratio of low chlorine content CPE to high chlorine content CPE of between about 5:1 to about 1.5:1, respectively, and more preferably between about 3:1 to about 2:1, respectively.

The Adhesive Layer

As discussed above, a barrier layer prepared from chlorinated polyethylene elastomer can provide good air retention and good cold flex durability. Barrier layers based on chlorinated polyethylene, however, possess poor adhesiveness to a tire carcass. This is demonstrated by Example 2. It is a discovery of the present invention that certain adhesive layers can be used to provide desired adhesion between the chlorinated polyethylene elastomer-based barrier layer and the pneumatic tire carcass.

Because the adhesive layer is provided primarily for bonding or adhering the barrier layer to the carcass, the thickness of the adhesive layer should be sufficient to accomplish this. It should also be appreciated that the adhesive layer should not be too thick so that excess material is used. In most embodiments of the present invention, this corresponds with a minimum practical thickness of the adhesive layer of between about 15 mil and about 20 mil when the film is processed in a calendering machine.

A preferred embodiment of the adhesive layer includes an elastomer composition based upon a sulfur-cured rubber composition containing an acrylonitrile/diene copolymer having an acrylonitrile (AN) content ranging between about 8 to 25 percent and preferably between about 10 to 20 percent.

The acrylonitrile/diene copolymers are intended to include acrylonitrile/butadiene and acrylonitrile isoprene copolymers. Preferably, the acrylonitrile/diene copolymer is an acrylonitrile/butadiene copolymer rubber (NBR). The preferred acrylonitrile/diene copolymer has an acrylonitrile content ranging from about 8 to about 25 percent. With increasing levels of acrylonitrile, the adhesive properties of the acrylonitrile/diene rubber layer will decrease. In addition, with increasing levels of acrylonitrile content, there is a decrease in the flexural properties at frigid temperatures, i.e., below −35° C.

Figure 4:
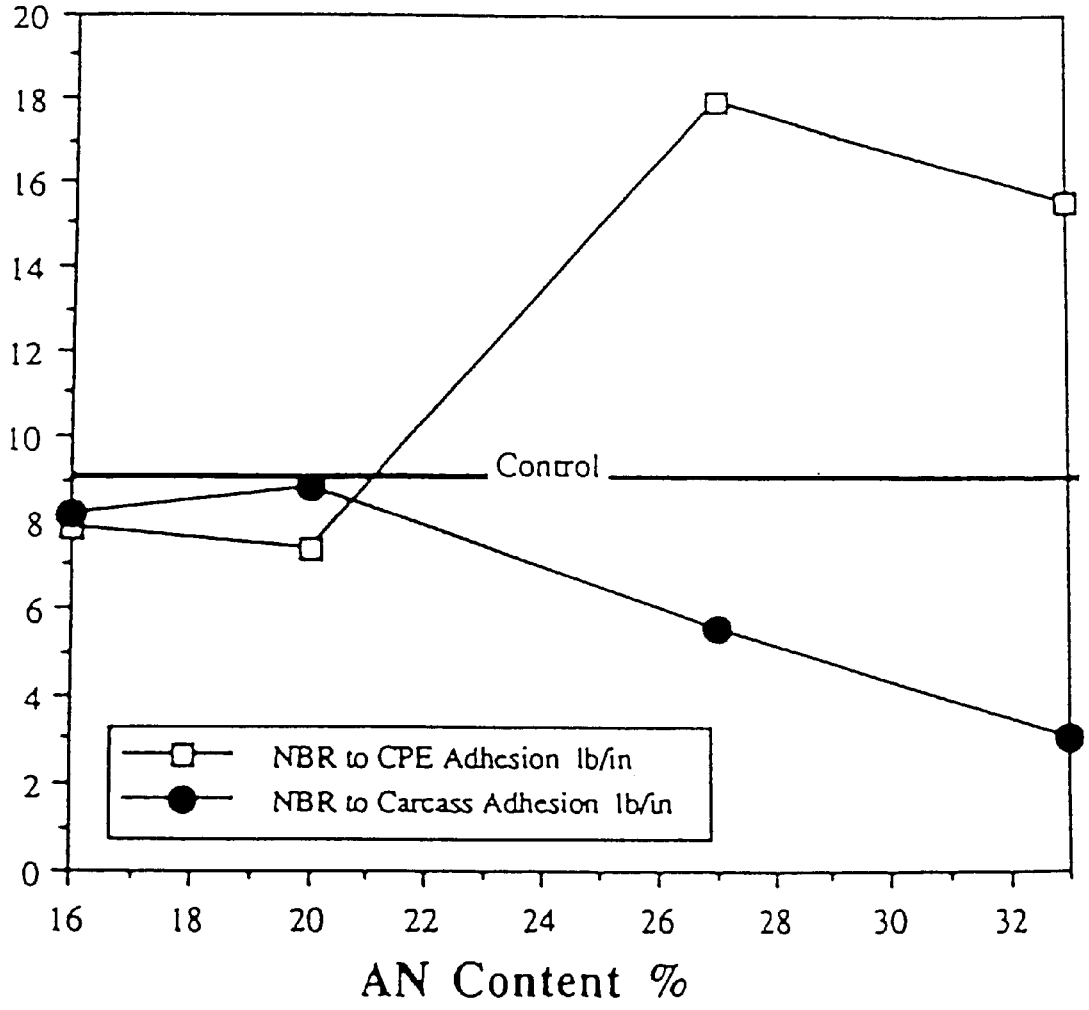
FIG. 4 shows the results provided by Example 6.

It is apparent from FIGS. 2–4 and Examples 2, 4 and 5 that the tested films 6 of chlorinated polyethylene elastomer (A,B) do not bond strongly to the carcass compound (D). However, when the CPE films were cured to an NBR compound (C), the peel adhesion values increased more than ten fold over the CPE/carcass results and were similar to the control butyl/carcass. The results are provided in Table 3. This demonstrates that NBR-based compounds possess adhesive properties for CPEs and carcass compound. One possible reason for the adhesion promotion is that the solubility parameters of NBRs (8.9–10) are intermediate between those of the CPEs (9.1 estimated from that of PVC) and the carcass compound composite (SBR 8.3, NR 7.8).

It was anticipated that by decreasing the AN content of NBR, its solubility parameter will also be decreased, making it a better adhesive for the carcass compound. FIG. 4 and Table 4 show data using the three-piece test piece with NBR adhesive layers having AN content from 16 to 33 percent. This data indicates that good adhesion values can be provided with an NBR adhesive layer having AN content between 16 and 27 percent.

A second preferred embodiment of the adhesive layer includes an elastomer composition based on ultra high molecular weight polyethylene which has a weight average molecular weight of at least about 500,000. Such ultra high molecular weight polyethylene typically has a weight average molecular weight which is within the range of about 500,000 to about 6,000,000 and preferably has a weight average molecular weight of at least about 1,000,000. As shown in Example 3, the use of an adhesive layer based on ultra high molecular weight polyethylene provides significantly increased adhesion as demonstrated by the large peel force properties obtained. Exemplary ultra high molecular weight polyethylene polymers are available from Hercules and Montell (formerly Himont).

The thickness of each non-barrier layer in the innerliner may vary depending on the number of layers in the laminate as well as the total thickness desired of the innerliner. Generally speaking, the thickness of each non-barrier layer may range from about 1 mil to about 45 mils. Preferably, the thickness of each non-barrier layer may range from about 4 mils to about 20 mils.

The various layers of the innerliner may be compounded with conventional rubber compounding ingredients. Conventional ingredients commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the sulfur-vulcanized rubber, certain additive mentioned above are commonly used in conventional amounts. Typical additions of carbon black comprise from about 10 to 100 parts by weight of rubber (phr), preferably 50 to 70 phr. Typical amounts of tackifier resins comprise about 2 to 10 phr. Typical amounts of processing aids comprise about 1 to 5 phr. Typical amounts of antioxidant comprise 1 to 10 phr. Typical amounts of antiozonants comprise 1 to 10 phr. Typical amounts of stearic acid comprise 0.50 to about 2 phr. Typical amounts of zinc oxide comprise 1 to 5 phr. Typical amounts of oils comprise 2 to 30 phr. Typical amounts of peptizers 0.1 to 1 phr. The presence and relative amounts of the above additives are not an aspect of the present invention.

The vulcanization of the composition for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in amounts ranging from about 0.2 to 8.0 phr with a range of from about 0.5 to 5.0 being preferred.

Accelerators can be used to control the time and/or temperature required for vulcanization and to improve the properties of the vulcanizate. A single accelerator system may be used; i.e., primary accelerator in conventional amounts ranging from about 0.3 to 5.0 phr. In the alternative, combinations of two or more accelerators may be used which may consist of a primary accelerator which is generally used in the larger amount (0.3 to 5.0 phr), and a secondary accelerator which is generally used in smaller amounts (0.05–1.0 phr) in order to activate and to improve the properties of the vulcanizate. Combinations of these accelerators have been known to produce a synergistic effect on the final properties and are somewhat better than those produced by either accelerator alone. In addition, delayed action accelerators which are not effected by normal processing temperatures but produce satisfactory cures at ordinary vulcanization temperatures may be used. Suitable types of accelerators that may be used are amine, disulfides, guanidines, thioureas, thiazoles, thiurams, sulfonamides, dithiocarbamate and xanthates. Preferably, the primary accelerator is a disulfide or sulfonamide. If a secondary accelerator is used, the secondary accelerator is preferably a guanidine, dithiocarbamate or thiuram compound.

In practice, the various rubber compositions are used to form a laminate. As known to those skilled in the art, the layers are produced by a press or passing a rubber composition through a mill, calender, multihead extruder or other suitable means. Preferably, the layers are produced by a calender because greater uniformity is believed to be provided. The layers are then assembled into a laminate. The uncured laminate is then constructed as an inner surface (exposed inside surface) of an uncured rubber tire structure, also known as the carcass. The innerliner is then sulfur-cocured with the tire carcass during the tire curing operation under conditions of heat and pressure. Vulcanization of the tire containing the innerliner of the present invention is generally carried out at temperatures of between about 100° C. and 200° C. Preferably, the vulcanization is conducted at temperatures ranging from about 110° C. to 180° C. Any of the usual vulcanization processes may be used, such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being cocured therewith as compared to being a simple adherent laminate. Typically, the innerliner of the present invention has an uncured gum thickness in the range of from about 15 mils to about 150 mils. Preferably, the innerliner has an uncured gum thickness in the range of from about 30 mils to about 75 mils. As a cured innerliner, the laminate may have a thickness ranging from about 8 mils to about 130 mils. Preferably, the thickness will range from about 15 mils to about 60 mils.

The pneumatic tire with the integral laminate innerliner may be constructed in the form of a passenger tire, truck tire or other type of bias or radial pneumatic tire.

Referring to FIG. 1, a preferred embodiment of the pneumatic tire according to the principles of the present invention is provided at reference numeral 10. The pneumatic tire 10 includes a tread 22, a reinforcing belt 24, a sidewall 26, an anular bead 18 and a barrier region 14. The sidewall 26, annular bead 18 and reinforcing belt 24 are in a region of the tire which is referred to as the carcass 20. The barrier region or innerliner 14 provides for the retention of compressed air inside the internal space 16 when the tire is mounted on a wheel and inflated with compressed air. The barrier region 14 can be referred to as the innerliner and includes a multilayer structure of a barrier layer 30 and an adhesive layer 32 for adhering the multilayer structure to the carcass 20.

In order to further illustrate certain applications and principles of the present invention, the following examples are provided. These examples are not intended to limit the scope of the invention.

EXAMPLE 1

The Relationship Between Chlorine Content of Chlorinated Polyethylene Elastomers and Barrier Properties and Low Temperature Flexibility Properties The following two samples of chlorinated polyethylene were provided:

A) Sample A is a chlorinated polyethylene elastomer having a chlorine content of 30 percent and is available from The Dow Chemical Company under the tradename TYRIN® CM0730.

B) Sample B is a chlorinated polyethylene elastomer having a chlorine content of 42 percent and is available from The Dow Chemical Company under the tradename TYRIN® 4211p.

The following three films were prepared and tested based upon samples A and B:

1) Film 1 was prepared from sample A to provide a film having a thickness of about 10 to 15 mil.

2) Film 2 was prepared from sample B to provide a film having a thickness of about 10 to 15 mil.

3) Film 3 was prepared by blending one part of sample B with three parts of sample A to provide a film having a thickness of about 10 to 15 mil.

Each of Films 1–3 was subjected to a low temperature (−40° C.) lab flex test and an air permeability test. The low temperature lab flex test involved Instron apparatus at a 12.5 percent extension ratio at 6,000 cycles at −40° C. If the test piece survived, it passed the test.

Film 1 passed the low temperature (−40° C.) lab flex test but exhibited an oxygen permeability value which is about 20 percent higher than the oxygen permeability of butyl rubber innerliner compound. Film 2 failed the (−40° C.) flex test but exhibited an oxygen permeability value which is about one-third of the oxygen permeability of butyl rubber innerliner compound. Film 3 passed the (−40° C.) flex test and exhibited an oxygen permeability value which is about equivalent to the oxygen permeability of butyl rubber innerliner compound.

EXAMPLE 2

Adhesion of Chlorinated Polyethylene Elastomer to 50/50 SBR/NBR

A layer of carcass compound (50/50 SBR/NR) was cured against a layer of chlorinated polyethylene elastomer having a chlorine content of 36 percent for 30 minutes at 150° C. The cured sample was tested on an Instron for peel force measurement. At cross head rate of 2"/min, the peel force was less than 1 lb/in.

EXAMPLE 3

An Adhesive Layer of Ultra High Molecular Weight Polyethylene Between Chlorinated Polyethylene Elastomer and 50/50 SBR/NBR The procedure of example 2 was repeated except that a layer of ultra high molecular weight polyethylene powder (Himont's 1900 powder) was placed between the carcass layer and the chlorinated polyethylene layer. After curing for 30 minutes at 150° C., it was observed that the ultra high molecular weight polyethylene powder was fused into a 1/50 inch film between the carcass layer and the chlorinated polyethylene layer. The peel force increased to 23.4 lb/in.

The procedure of example two was repeated except that the ultra high molecular weight polyethylene component was Himont's HB 314 polymer. After curing for 30 minutes at 150° C., the peel force was measured at 17.4 lb/in.

EXAMPLE 4

Adhesion of Chlorinated Polyethylene Elastomer to 50/50 SBR/NR

Chlorinated polyethylene barrier film is based on Dow Chemical's Tyrin 4211 (42 percent Cl) and the carcass compound is based on 50/50 SBR/NR. These two layers were cured together at 150° C. for 25 minutes. There was very little adhesion developed between the two layers. The peel adhesion force was 0.8 lb/in which is not adequate for any tire application.

EXAMPLE 5

An Adhesive Layer of Nitrile Rubber Between Chlorinated Polyethylene Elastomer and 50/50 SBR/NR A layer of adhesive based on Goodyear's nitrile rubber Chemigum® N926 (16 percent acrylonitrile) was placed between the two components mentioned in Example 4. The peel adhesion values were 7.8 and 8.2 lb/in for CPE-N926 and carcass -N926 respectively. These values are a major improvement over adhesion values in Example 4.

Same test was conducted with adhesive layer based on Chemigum® N984B (20 percent acrylonitrile). The results were 7.4 and 8.8 lb/in for CEP-N984B and carcass-N984B, respectively. Again, it showed that the nitrile rubber-based adhesive layer bonds CPE and carcass well.

EXAMPLE 6

Nitrile rubbers (NBRs) with varying acrylonitrile (AN) contents were selected as potential adhesive layers to bond barrier films to tire carcass compounds. The barrier films studied are based on chlorinated polyolefin elastomer containing 42 percent chlorine. NBRs having acrylonitrile contents in the 16–39 percent range were evaluated.

The following materials were used in this example.

TABLE 2

Materials

| Code | Material | Function |
|---|---|---|
| A | Dow Tyrin 4211 (42% Cl)* | Barrier film |
| B | Dow Tyrin 4211 (42% Cl)* | Barrier film |
| C | NBR N-300 (39% AN) | Adhesive |
| D | NR/SBR (52/48) | Carcass |
| E | NBR N-926 (16% AN) | Adhesive |
| F | NBR N-984B (20% AN) | Adhesive |
| G | NBR N-785B (27% AN) | Adhesive |
| H | NBR N-624B (33% AN) | Adhesive |
| I | butyl rubber innerliner | Control |

*Samples from two different batches

Testing:

FIG. 2 shows the configuration of the test piece used to measure (peel) adhesion of the various components. FIG. 3 shows the configuration of an adhesion test piece which simulates tire construction. The adhesion test pieces were all cured at 150° C. for 25 minutes and tested on an Instron (crosshead speed 5 cm/min.) at room temperature. Peel adhesion values were calculated from the average peel force when steady-state was reached. The results are provided in FIG. 4.

TABLE 3

Initial Peel Adhesion Values Using the 2-Piece Samples

| Test-Piece Configuration | | Adhesion, lb/in |
|---|---|---|
| Control: | Butyl Rubber - Carcass (D) | 9.0 |
| | CPE(A) - Carcass (D) | 0.7 |
| | CPE(B) - Carcass (D) | 0.8 |
| | CPE(A) - NBR-N300(C) | 8.6 |
| | CPE(B) - NBR-N300(C) | 8.0 |

TABLE 4

Bonding CPE to Carcass Using NBRs - 3-Piece Samples

| Composite | Components | Adhesion, lb/in. |
|---|---|---|
| Control | Butyl Rubber/Carcass (D) | 9.0 |
| 1 | CPE(A)/NBR(E, 16% AN) | 7.8 |
| | NBR(E)/Carcass | 8.2 |
| 2 | CPE(A)/NBR(F, 20% AN) | 7.4 |
| | NBR(F)/Carcass | 8.8 |
| 3 | CPE(A)/NBR(G, 27% AN) | 17.9 |
| | NBR(G)/Carcass | 5.5 |
| 4 | CPE(A)/NBR(H, 33% AN) | 15.5 |
| | NBR(H)/Carcass | 3.0 |

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A pneumatic tire comprising a carcass and an innerliner, said innerliner comprising a multilayer structure including a barrier layer and an adhesive layer, the barrier layer comprising a blend of high chlorine content chlorinated polyethylene elastomer and low chlorine content chlorinated polyethylene elastomer, the high chlorine content chlorinated polyethylene elastomer having a chlorine content of between about 35 percent to about 45 percent and the low chlorine content chlorinated polyethylene elastomer having a chlorine content of between about 25 percent to about 35 percent, wherein the high chlorine content polyethylene elastomer has a chlorine content which is at least 5 percentage points higher than the chlorine content of the low chlorine content polyethylene elastomer, and wherein the barrier layer has an average chlorine content of about 30 percent to about 35 percent;

the adhesive layer comprising a polymer composition for adhering the barrier layer to said rubber carcass; and wherein the carcass and the innerliner are cured, and the innerliner provides an oxygen permeability of less than 250 cc-mil/100 $in^2$-atm-day at 65° C. and good cold flexibility at −40° C.

2. The pneumatic tire according to claim 1 wherein the low chlorine content chlorinated polyethylene elastomer and the high chlorine content chlorinated polyethylene are provided in a ratio of between about 5:1 to about 1.5:1, respectively.

3. The pneumatic tire according to claim 1 wherein the low chlorine content chlorinated polyethylene elastomer has a chlorine content in the range of about 28 percent to about 32 percent.

4. The pneumatic tire according to claim 1 wherein the high chlorine content chlorinated polyethylene elastomer has a chlorine content in the range of about 38 percent to about 43 percent.

5. The pneumatic tire according to claim 1 wherein said carcass comprises a SBR/NR blend.

6. The pneumatic tire according to claim 1 wherein the adhesive layer comprises ultra high molecular weight polyethylene having a weight average molecular weight of at least about 500,000.

7. The pneumatic tire according to claim 1 wherein the adhesive layer comprises nitrile rubber.

8. A pneumatic tire according to claim 7 wherein the nitrile rubber has an acrylonitrile content which is within the range of about 16 percent to about 27 percent.

9. A pneumatic tire according to claim 6 wherein the ultra high molecular weight polyethylene has a weight average molecular weight of at least 1,000,000.

10. The pneumatic tire according to claim 1 wherein the low chlorine content chlorinated polyethylene elastomer and the high chlorine content chlorinated polyethylene are provided in a ratio of between about 3:1 to about 2:1, respectively.

11. The pneumatic tire according to claim 1 wherein the high chlorine content polyethylene has a chlorine content which is at least 10 percentage points higher that the chlorine content of the low chlorine content polyethylene.

12. The pneumatic tire according to claim 1 wherein the low chlorine content chlorinated polyethylene elastomer has a chlorine content in the range of about 28 percent to about 32 percent; and wherein the high chlorine content chlorinated polyethylene elastomer has a chlorine content in the range of about 38 percent to about 43 percent.

13. The pneumatic tire according to claim 12 wherein the high chlorine content polyethylene has a chlorine content which is at least 10 percentage points higher that the chlorine content of the low chlorine content polyethylene.

14. The pneumatic tire according to claim 1, wherein the carcass and innerliner are cured at a temperature of between about 100° C. and 200° C.

15. The pneumatic tire according to claim 1, wherein the carcass and the innerliner are cured at a temperature of between about 110 C. and 180° C.

16. The pneumatic tire according to claim 1, wherein the innerliner has a thickness of between about 8 mils to about 130 mils.

17. The pneumatic tire according to claim 1, wherein the innerliner has a thickness of between about 15 mils and about 60 mils.

18. The pneumatic tire according to claim 1, wherein the innerliner is vulcanized in the presence of a sulfur vulcanizing agent.

19. The pneumatic tire according to claim 1, wherein the innerliner comprises an accelerator comprising amines, disulfides. guanidines, thioureas, thiazoles, thiurams, sulfonamides, dithiocarbamate, xanthates, and mixtures thereof.

20. The pneumatic tire according to claim 1, wherein the innerliner and the carcass are sulfur cocured.

21. The pneumatic tire according to claim 1, wherein the innerliner is calendered prior to attachment to the carcass.

22. A pneumatic tire according to claim 1, wherein the barrier layer has an average chlorine content of about 30 percent to less than 35 percent.

* * * * *